Patented Nov. 15, 1927.

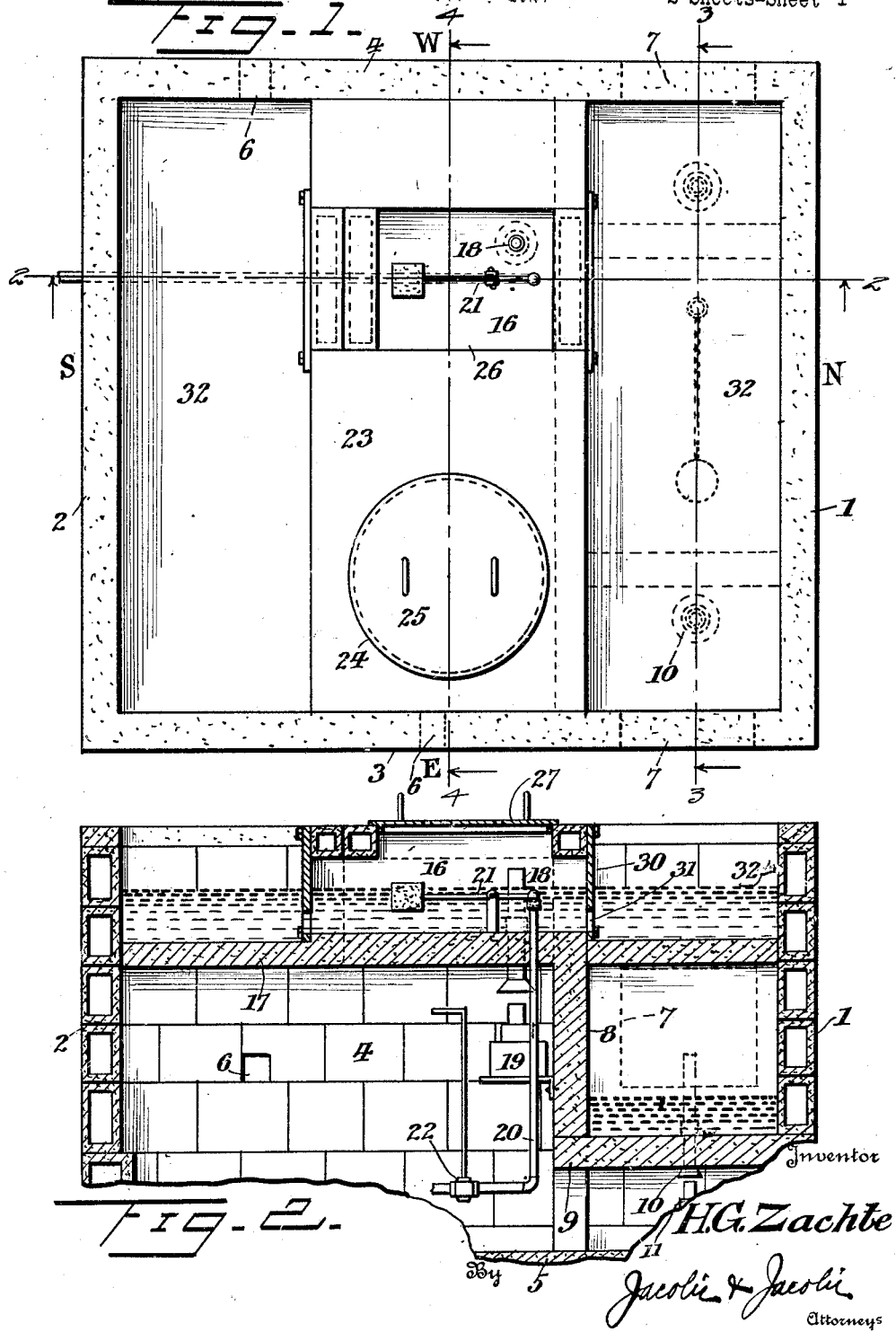

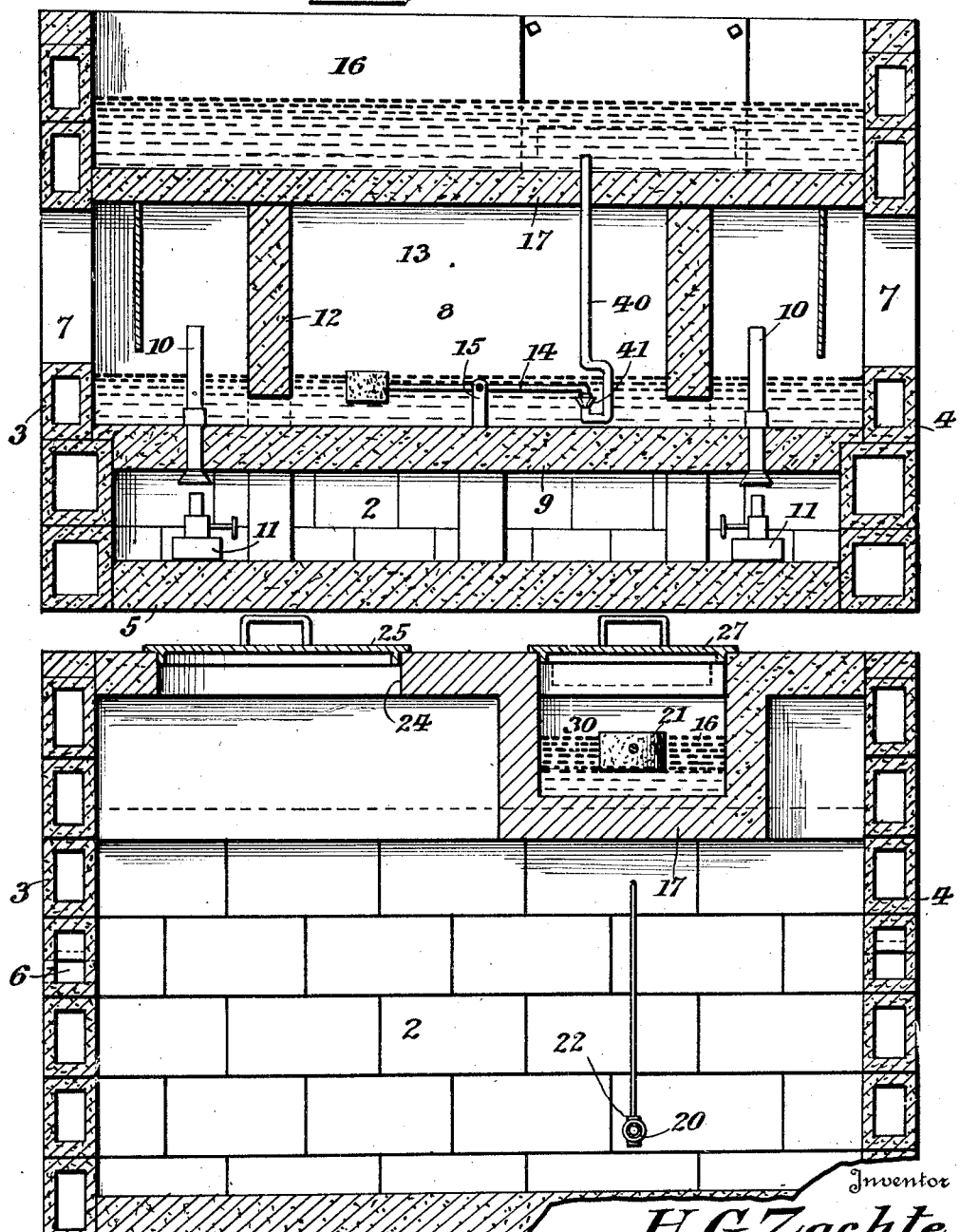

1,649,009

UNITED STATES PATENT OFFICE.

HENRY G. ZACHTE, OF LAMBERTON, MINNESOTA.

STOCK WATERER.

Application filed February 3, 1927. Serial No. 165,711.

This invention relates to improvements in stock waterers and it consists in the novel features hereinafter described and claimed.

An object of the invention is to improve the construction of stock waterers, and to provide a simple, inexpensive and efficient device designed for affording both hogs and cattle a supply of fresh water, and adapted as the water is consumed, to feed a fresh supply in the troughs, and capable of automatically cutting off the flow of water, when the same is in a predetermined level in the troughs.

A further object of the invention is to provide simple and efficient means for preventing the water from freezing in cold weather, also means for preventing the device from rusting or corroding.

With these and other objects in view the stock waterer includes a structure which is preferably formed from cement, concrete blocks and slabs and which is partially embedded in the ground in order that the heat of the earth may be used in part, for preventing the water from freezing. Means are provided for supplying artificial heat and which may be used in extremely cold weather or in cold climate for positively preventing the freezing of the water. The structure of the body of the stock waterer includes walls which differ slightly in construction and which are so positioned with relation to the cardinal point of the compass that a certain wall is exposed to the north, another wall exposed to the south and the remaining two walls exposed to the east and west, respectively. These walls have their elements and features so related as to prevent the cold wind which usually comes from the west and the north from having direct contact with the water and at the same time the water is accessible to the animal for drinking purposes. Also means are provided for supplying oxygen from the external atmosphere to the lamp or burners which are used for supplying the artificial heat.

In the accompanying drawings:

Figure 1 is a top plan view of the stock waterer with parts thereof removed.

Figure 2 is a fragmentary transverse sectional view thereof cut on the line 2—2 of Figure 1.

Figure 3 is a transverse sectional view of the stock waterer cut on a plane at a right angle to that upon which Figure 2 is cut and on the line 3—3 of Figure 1.

Figure 4 is a fragmentary transverse sectional view of the stock waterer cut on the line 4—4 of Figure 1.

The stock waterer comprises a rectangular structure having side and end walls and the structure, in practice, is embedded in the ground to the extent of approximately five feet leaving the upper portion of the structure disposed above the surface of the ground to the extent of approximately two feet. When the structure is erected the wall 1 is exposed to the north, the wall 2 to the south, the wall 3 to the east and the wall 4 to the west. The bottom of the structure is closed by a bottom wall or slat 5. The walls 1, 2, 3 and 4 are preferably formed of hollow clay block or concrete cement block made in a usual manner. These blocks are hollow in order to provide air spaces which render the walls comparatively warm in winter and cool in summer. The east and west walls 3 and 4 are provided with air ports 6 through which atmospheric air may be admitted into the lower portion of the structure for supplying oxygen to burners which are used in the interior of the structure and which will be described hereinafter. The east and west walls 3 and 4 are further provided with openings 7 through which hogs or other smaller animals may pass their heads to partake of the volume of water which is contained within the structure and as hereinafter described. The structure is provided with a trough 8 which is disposed along the wall 1 and which communicates at its end with the opening 7. The bottom wall 9 of the trough 8 is spaced above the bottom wall 5 of the structure. Flue pipes 10 pass vertically through the bottom wall 9 of the trough 8 and lamps 11 are located under the lower ends of the flue pipe. The upper ends of the flue pipe 10 extend above the plane in which the lower side of the opening 7 lies as best illustrated in Figure 3 of the drawings. Hanging walls 12 are provided in the trough 8 and the lower edges of the walls 12 are spaced from the bottom wall 9 and the said hanging walls 12 are also spaced from the walls 3 and 4, respectively, and form chambers adapted to hold water adjacent the openings 7 so that hogs, sheep, calves, colts or other small animals may partake of the water which is contained within the trough 8 through the openings 7. The hanging walls 12 also divide the trough 8 into an intermediate chamber 13 which contains a float valve 14 pivotally mounted upon a standard 15 erected upon the bottom wall 9. When the lamps 11 are lighted the products of combustion pass in an upward direction through the flue pipes 10 and the bottom wall 9 and prevent the water which is contained within the trough 8 from freezing in cold weather.

A trough 16 is located in the intermediate upper portion of the structure and is disposed transversely with relation to the trough 8. The trough 16 is provided with a bottom wall 17 through which a flue pipe 18 passes. The trough 16 is located above the trough 8. The lamp 19 is located in the structure below the walls 17 and when the same is lighted the products of combustion pass through the flue pipes 18 and prevent the water which is contained within the trough 16 from freezing. A water service pipe 20 enters the lower portion of the structure and passes upwardly through the bottom wall 17 of the trough 16. A float valve 21 is located in the trough 16 and is arranged to close the upper end of the pipe 20 when the water in the trough 16 arrives at a predetermined level. The flow of water through the pipe 20 is controlled by the valve 22 which is located interiorly of the structure and the pipe 20 and valve 22 are exposed to the heat which radiates from the lamp 19. The major portion of the trough 16 is closed by a top wall 23 which is provided with an opening 24 normally closed by a cap plate 25. The top wall 23 is further provided with an opening 26 which is normally closed by a cap plate 27 as best shown in Figure 2.

The ends of the trough 16 are partially closed by plates 30 having at their lower portion openings 31 through which water may pass from the trough 16 into troughs 32 which are disposed within the structure and adjacent the walls 1 and 2. The troughs 32 are located in a higher plane than that in which the trough 8, hereinbefore described, lies and the water which enters the troughs 32 is accessible to horses, cattle and other larger animals for drinking purposes. The flue pipes 10 which pass through the bottom wall 9 in the trough 8 are located under the bottom wall of the troughs 32 which is adjacent the wall 1 and which in turn is exposed to the north. Therefore, the said flue pipes serve as means for conducting the products of combustion of the lamp 11 under the said troughs 32 and thus preventing the water therein from freezing. The atmospheric air may enter the interior and lower portion of the structure through the openings 6 and thus supply sufficient oxygen to the lamps or heaters 11 and 19 and the said air may serve as means for ventilating the lower portion of the structure.

A pipe 40 passes through the bottom wall 17 of the trough 16 and is provided at its lower end with a return bend 41 having a seat adapted to co-act with the valve structure 14 for shutting off the supply of water to the trough 8 when the same has reached a predetermined level.

Thus, it will be seen that the water is first conducted into the trough 16 through the pipe 20 and then passes down through the pipe 40 into the trough 8. From the respective trough the water may flow into the troughs 32 and into the chambers at the ends of the trough 8 to be consumed by the animal as hereinbefore described.

From the foregoing description of the construction of my improved device, it will be seen that I have provided a simple, inexpensive and efficient means for carrying out the objects of the invention.

While I have particularly described the elements best adapted to perform the functions set forth, it is obvious that various changes in form, proportion and in the minor details of construction may be resorted to without departing from the spirit or sacrificing any of the principles of the invention.

Having described the invention, what is claimed is:

1. A stock waterer comprising a structure having side and bottom walls, two of the side walls being provided with relatively large openings located at intermediate points of the said walls, a trough communicating at its end with said openings and located in the lower portion of the structure, overhanging walls located in said trough and spaced from said opening, an elevated trough located in the structure and being open at its top side, valve controlled means for admitting water in the elevated trough, means for conducting water from the elevated trough into the lower trough and means for heating the water in the troughs.

2. A stock waterer comprising a structure having side and bottom walls, a lower trough located in the structure and provided at its ends with openings disposed through opposite side walls of the structure, the structure having overhanging walls located in said trough and spaced from said openings, flues passing through the bottom of said trough and disposed between the overhanging walls and the openings, means located in the structure for discharging products of combustion into the flues, an elevated trough located in the structure, means for admitting water into the elevated structure and means for conducting water from the elevated trough into the lower trough.

3. A stock waterer comprising a structure provided at opposite sides with an opening, a trough located in the structure and communicating with said openings, said structure having overhanging walls located in said trough and spaced from said openings, the structure having an elevated trough located above the first mentioned trough, means for admitting water into the elevated trough, means for conducting water to the elevated trough, means for conducting water from the elevated trough into the lower trough, flues passing through the bottoms of the troughs, and means for discharging products of combustion into the flues.

In testimony whereof I affix my signature.

HENRY G. ZACHTE.